US009160661B2

(12) United States Patent
Balasubramanian (10) Patent No.: US 9,160,661 B2
(45) Date of Patent: *Oct. 13, 2015

(54) METHOD AND APPARATUS FOR FULL DUPLEX SERIAL SHIFTING MODE AND SWITCH MODE DATA TRANSMISSION

(71) Applicant: Rockwell Automation Technologies, Inc., Mayfield Heights, OH (US)

(72) Inventor: Sivaram Balasubramanian, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/340,082

(22) Filed: Jul. 24, 2014

(65) Prior Publication Data

US 2014/0334341 A1  Nov. 13, 2014

Related U.S. Application Data

(63) Continuation of application No. 13/149,273, filed on May 31, 2011, now Pat. No. 8,824,333.

(51) Int. Cl.
*H04L 12/741* (2013.01)
*H04L 12/40* (2006.01)
*H04L 12/28* (2006.01)

(52) U.S. Cl.
CPC .............. *H04L 45/745* (2013.01); *H04L 12/28* (2013.01); *H04L 12/40032* (2013.01)

(58) Field of Classification Search
None
See application file for complete search history.

(56) References Cited

U.S. PATENT DOCUMENTS

| 7,519,076 | B2 | 4/2009 | Janssen et al. |
| 7,697,538 | B2 | 4/2010 | Buettner et al. |
| 7,702,834 | B2 | 4/2010 | Beckhoff et al. |
| 7,760,753 | B2 | 7/2010 | Schultze et al. |
| 2004/0245783 | A1 | 12/2004 | Gilbreth et al. |
| 2006/0212604 | A1 | 9/2006 | Beckhoff et al. |
| 2007/0076243 | A1 | 4/2007 | Janssen et al. |
| 2007/0233919 | A1 | 10/2007 | Miura |
| 2009/0083464 | A1 | 3/2009 | Beckhoff et al. |

(Continued)

OTHER PUBLICATIONS

"EtherCAT topology types and their influence on system characteristics", http://www.pc-control.net/pdf/032008/pcc_0308_Topologie_EtherCAT_e.pdf; Mar. 2008.

(Continued)

*Primary Examiner* — Hicham Foud
(74) *Attorney, Agent, or Firm* — Boyle Fredrickson, S.C.

(57) ABSTRACT

An industrial network with bidirectional communication for real time control includes nodes selectively operable in either a switch mode or a serial shifting mode. Nodes operating in the switch mode are capable of initiating data frames for transmission on the network and receiving data frames from the network. Nodes operating in either the switch mode or the serial shifting mode are capable of extracting and/or inserting data into a data frame as it is transmitted through that node. An initialization procedure determines end nodes and intermediate nodes within the network. The end nodes are configured to initially operate in the switch mode and the intermediate nodes are configured to initially operate in the serial shifting mode. The intermediate nodes are additionally operable to selectively toggle between operation in switch mode and serial shift mode and may operate in both modes during a single scan cycle.

20 Claims, 3 Drawing Sheets

(56) References Cited

U.S. PATENT DOCUMENTS

| | | |
|---|---|---|
| 2009/0129395 A1 | 5/2009 | Janssen et al. |
| 2009/0292845 A1 | 11/2009 | Buttner et al. |
| 2010/0111082 A1 | 5/2010 | Janssen et al. |
| 2010/0122003 A1 | 5/2010 | Hu et al. |
| 2010/0146176 A1 | 6/2010 | Beckhoff et al. |
| 2012/0179849 A1 | 7/2012 | Mizutani |

OTHER PUBLICATIONS

"EtherCAT—the Ethernet fieldbus", http://www.ethercat.org/pdf/ethercat_e.pdf. May 2011.

METHOD AND APPARATUS FOR FULL DUPLEX SERIAL SHIFTING MODE AND SWITCH MODE DATA TRANSMISSION

CROSS-REFERENCE TO RELATED APPLICATIONS

This application is a continuation of U.S. application Ser. No. 13/149,273, filed May 31, 2011, which issued as U.S. Pat. No. 8,824,333 on Sep. 2, 2014, the entire contents of which is incorporated herein by reference.

BACKGROUND OF THE INVENTION

The subject matter disclosed herein relates generally to industrial control networks for controlling machines and industrial processes and, more specifically, to a network interface for individual nodes on the network which is configurable to execute in either a switch mode or a serial shift mode.

Industrial controllers are special purpose computers used for controlling factory automation and the like. Industrial controllers typically execute a control program highly customized to a particular control application. Special control languages, such as "relay ladder logic" are normally used to facilitate programming of the device. Under the direction of the stored program, a processor of the industrial controller periodically examines the state of input devices and updates the state of output devices. In order to ensure predictable control of a machine or process, the control program must be highly reliable and execute at well-defined time periods.

As industrial processes grow in complexity, an increasing number of devices are being connected to the industrial controller. The devices are often distributed about a machine or along a process line. An industrial network is typically used to connect the distributed devices and to allow data to be transmitted between the devices. However, the increasing number of devices requires an increased volume of communications between those devices. Yet, the control program still requires that the communications be performed in a well-defined time period. Thus, either the amount of time allocated to communications must increase or the transmission rate must increase. Because the industrial controller typically has a fixed time interval in which to execute each cycle of the program, it is more desirable to increase the transmission rate.

As is known to those skilled in the art, recent techniques to increase the transmission rate include data insertion or extraction from Ethernet frames without fully processing the frame. A master device generates a data frame and circulates it through a series of slave devices in a ring topology. The data frame includes a data block with portions reserved for each slave device. As the frame is received at each slave device, that device may either insert data in, or extract data from, the point in the data block reserved for that device without processing the entire frame. After accessing its portion of the data block, the slave device retransmits the data frame to the next slave device. The last slave device returns the frame to the master device to complete processing of the frame.

However, such systems have not been fully met without incurring various disadvantages. The master device is the only device capable of generating a data frame. The data frame is then circulated in a ring topology to a number of slave devices connected to the master device. Consequently, one slave device wishing to communicate with another slave device upstream from the first device must first insert data into one data frame, and the master device must then include that data into the next data frame from which the upstream slave device may extract the data on a subsequent communication cycle.

Another disadvantage of prior systems is that only one master device may talk to any of the slave devices connected to that master. Although it is common to have multiple, remote master devices, which may communicate with each other, if a remote master device needs data from, or needs to supply data to, a slave device connected to a second master device, the remote master device cannot communicate directly with that slave device.

BRIEF DESCRIPTION OF THE INVENTION

The subject matter disclosed herein describes an industrial network with bidirectional communication for real time control. The network includes at least two end nodes configured to operate in a switch mode. The network further includes at least one intermediate node connected between the end nodes which may be configured to communicate in either a switch mode or a serial shifting mode. All network nodes are time synchronized with each other through a suitable protocol such as IEEE 1588. Nodes operating in the switch mode are capable of initiating data frames for transmission on the network and receiving data frames from the network. Nodes operating in the serial shifting mode and the switch mode are capable of extracting and/or inserting data into a data frame as it is transmitted through that node. An initialization procedure determines end nodes and intermediate nodes within the network. The end nodes are configured to initially operate in the switch mode and the intermediate nodes are configured to initially operate in the serial shifting mode. The intermediate nodes may be operable to selectively toggle between operation in switch mode and serial shift mode and may further operate in both modes during a single I/O scan cycle. When the intermediate nodes operate in switch mode, they can initiate data frames to any other node on the network or receive data frames from any other node on the network.

According to one embodiment of the invention, an industrial communication network for real-time control connects at least three nodes for bidirectional communication via a network medium. The industrial communication network includes at least two end nodes, each end node having a network interface configured to execute in a first mode of operation to initiate transmission of a data frame via the network medium to at least one other end node. The data frame further includes a unique identifier, a frame priority, and a structured data block. The industrial communication network further includes at least one intermediate node having a network interface configured to operate in a second mode of operation to perform the following steps: receive the data frames from each of the end nodes, select data frames as a function of the unique identifier, extract data from or insert data to a predefined position of the structured data block, and transmit the data frame to the other of the end nodes.

According to another embodiment of the invention, a network interface for a node operable to communicate with at least two other nodes via a network medium in an industrial network includes a first port configured to transfer a data frame between the node and a first of the other nodes via the network medium and a second port configured to transfer the data frame between the node and a second of the other nodes via the network medium. The data frame includes a unique identifier, a frame priority, and a structured data block. A memory device is operable to store a table containing a plurality of unique identifiers corresponding to a plurality of structured data blocks. A network address identifies the node on the industrial network, and a transmission schedule stored in the memory device defines at least two periods. The network interface executes the transmission schedule at a periodic interval and processes the data frames received at the first and second ports in a first operating mode during a first of the two periods and in a second operating mode during a second of the two periods.

According to still another embodiment of the invention, a method of transferring data frames between nodes on an industrial network, configured to connect multiple nodes for real-time control of a process, configures at least a first node and a second node as end nodes operating in a first mode. The first node initiates transmission of a data frame to the second node and the second node initiates transmission of a data frame to the first node, and each data frame includes a unique identifier, a frame priority, and a structured data block. At least one node is configured as an intermediate node operating in a second mode, and each intermediate node reads data frames from both the first and the second end node. A unique identifier, contained within each data frame received at the intermediate node, is read from the data frame. The unique identifier is a function of the end node from which it is initiated and of the data block contained within the data frame. Data frames are selected as a function of the unique identifier, and data is extracted from or inserted to the data frame as a predefined position of the data block. The data frame is then transmitted to the other of the first and the second end node.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Figure 1:
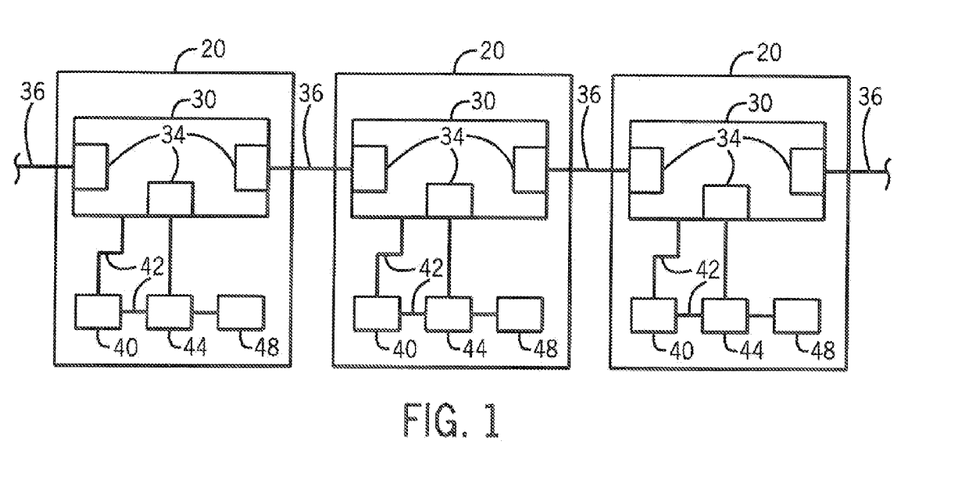
FIG. 1 is a block diagram representation of control devices connected according to one embodiment of the present invention.

Turning initially to FIG. 1, three nodes 20 are connected via a network medium 36. The network medium 36 may be any suitable medium including, but not limited to, a network cable, a backplane, or wireless connection points. Each node 20 includes a network interface 30 which, in turn, includes ports 34 configured to connect to the network medium 36. Each network interface 30 may also include a port 34 configured to communicate with a processor 44 in the node 20. Each network interface 30 has one or more buffers in communication with the port 34 for temporarily storing data received at or to be transmitted from the port 34. Each node 20 includes a clock circuit 40 providing a clock signal 42 to the processor and a memory device 48 operatively connected to the processor 44. Optionally, the clock circuit 40 may similarly provide a clock signal 42 directly to the network interface 30. It is also contemplated that each node 20 may have numerous other hardware configurations without deviating from the scope of the invention. For example, one or more of the processor 44, memory device 48, and clock circuit 40 may be integrated with the network interface 30 on a single field programmable array (FPGA) or application specific integrated circuit (ASIC).

Figure 2:
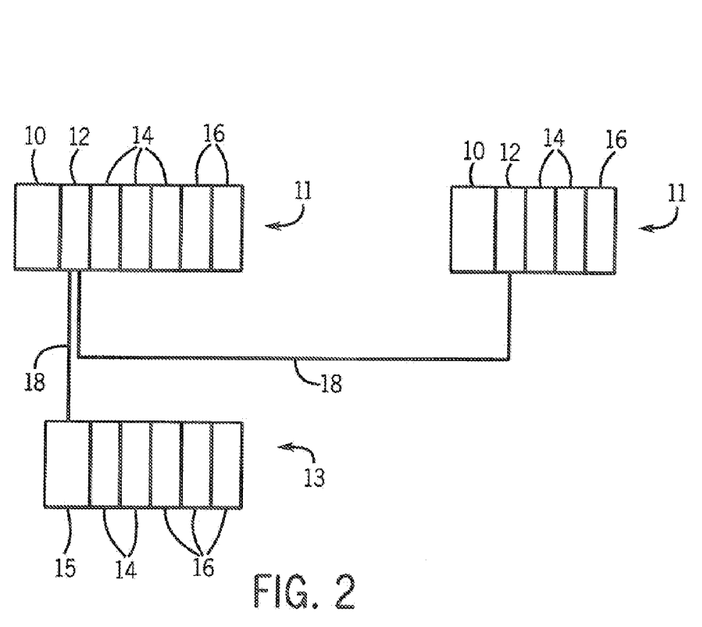
FIG. 2 is a block diagram representation of an exemplary environment incorporating one embodiment of the present invention.

Referring next to FIG. 2, an exemplary environment incorporating the present invention includes a pair of industrial controller racks 11 and a remote Input/Output (I/O) rack 13. Each of the industrial controller racks 11 include a power supply module 10, a processor module 12, input modules 14, and output modules 16. A remote I/O rack 13 includes an interface module 15 which manages communication between the industrial controller rack 11 and the input modules 14 and output modules 16 contained within the I/O rack 13. A communication cable 18 connects the processor modules 12 to each other and to the interface module 15. The communication cable 18 may be a cable configured to use any suitable communication protocol as is known in the art. It is understood that the industrial controller racks 11 and remote I/O rack 13 may include numerous configurations of modules or, optionally, be integrated into a controller with a fixed configuration.

Figure 3:
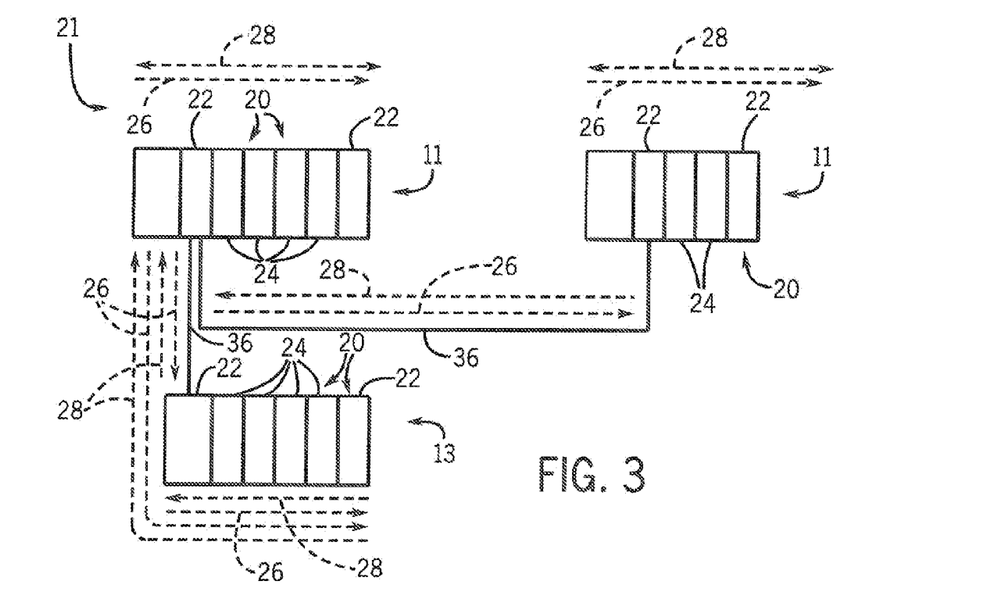
FIG. 3 is a block diagram representation illustrating the configuration and communication of devices within the environment of FIG. 2.

Referring next to FIG. 3, an exemplary network 21 configured to operate on the environment of FIG. 2 is illustrated. Each of the processor modules 12, input modules 14, and output modules 16 may serve as a node 20. Each node 20 is further identified as either an end node 22 or an intermediate node 24. Each of the end nodes 22 are configured to operate in a first mode of operation, also referred to herein as a switch mode, and each of the intermediate nodes 24 are configured to operate in a second mode of operation, also referred to herein as a shift mode. Although, each of the end nodes 22 and intermediate nodes 24 are identified as operating in a either a switch mode or a shift mode, it is contemplated that each of the end and intermediate nodes, 22 and 24 respectively, will be configurable to operate in either the switch mode or the shift mode and further may be selectively operable in both modes within a single I/O scan cycle during normal operation.

Each of the end nodes 22, operating in switch mode, are configured to initiate transmission of data frames on the network medium 36 to another end node 22. For example, the network medium 36 connecting the two industrial controller racks 11 to each other or to the remote I/O rack 13 is the communication cable 18 while the network medium 36 connecting end nodes 22 within each of the industrial controller racks 11 or within the remote I/O rack 13 is a backplane. The data frames transmitted by one end node 22 are typically received by other end nodes 22, but may also be transmitted directly to or from intermediate nodes 24 when they are operating in switch mode. Examples of the bi-directional communications are illustrated in FIG. 3, with transmissions in a first direction 26 being sent between two end nodes 22 and transmissions in a second direction 28 similarly being sent between the same two end nodes 22. As illustrated in FIG. 3, the bidirectional communications permits each node 20 along a communication path to communicate with another node 20 in the communication path in a single cycle. Any of the nodes 20 may access a data frame going in either the first or the second direction, 26 or 28, to provide data to or receive data from another of the nodes 20 within one cycle. Further, each end node 22 may be configured to initiate data frames to multiple other end nodes 22 such that each end node 22 may communicate with any intermediate node 24 as required by the application requirements during a single I/O scan cycle.

Figure 4:
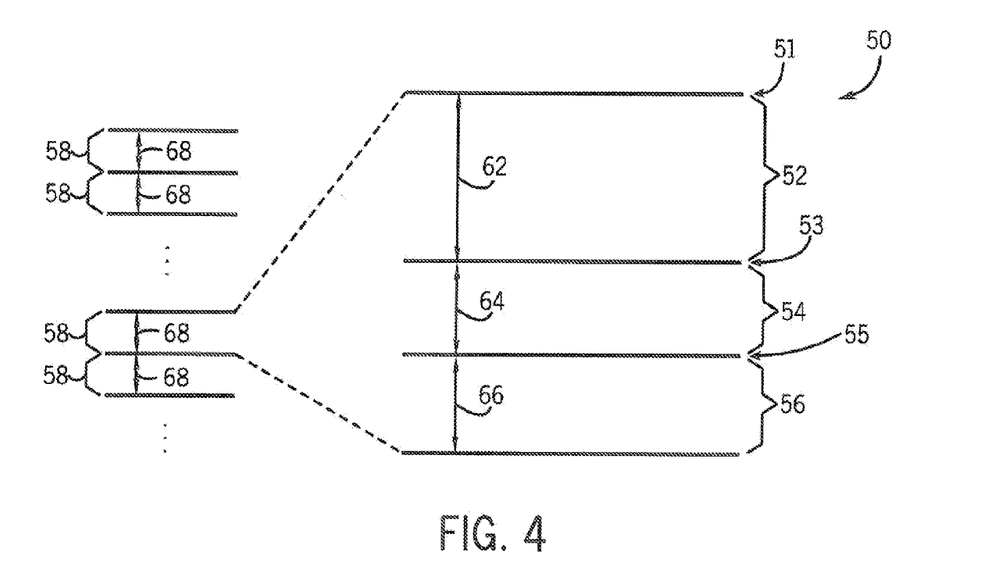
FIG. 4 is a timing diagram illustrating bandwidth allocation for one of the nodes communicating according to one embodiment of the present invention.

Referring next to FIG. 4, a transmission schedule 50 for a single I/O scan cycle may be implemented within each of the nodes 20 to define communications between the nodes 20. The transmission schedule 50 includes one or more priority windows, 52, 54, and 56, executing within a periodic interval 58 having a duration 68. A priority window, 52, 54, or 56, is a time window during which only data frames 80 having predefined priorities will be transmitted and data frames 80 of other priorities will be stored in a buffer for future transmission. The illustrated embodiment includes a first priority window 52, a second priority window 54, and a third priority window 56. Each priority window, 52, 54, and 56, is further defined by a start time, 51, 53, and 55, and duration, 62, 64, and 66 respectively. Each of the start times, 51, 53, and 55, and durations, 62, 64, and 66, are configurable. Further, the number of priority windows, 52, 54, and 56, executing within the periodic interval 58 is configurable and may be a function of whether the node 20 is an end node 22 or an intermediate node 24. The priority of data frames 80 to be transmitted during a priority window, 52, 54, or 56, are configurable, and whether a node 20 is operating in the switch mode or the serial shifting mode of operation during a priority window, 52, 54, or 56, is also configurable.

Figure 5:
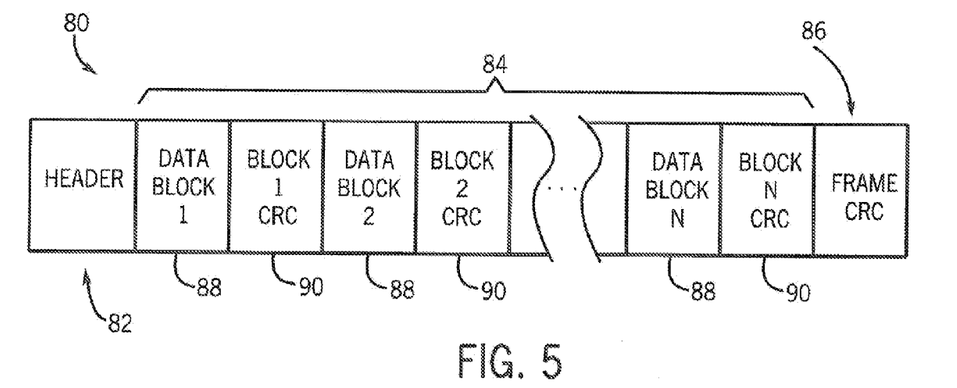
FIG. 5 illustrates an exemplary data frame according to one embodiment of the present invention.

Turning next to FIG. 5, a data frame 80 initiated by one of the nodes 20 includes a header 82, a structured data block 84, and a frame error detection code 86. The header 82 includes a unique identifier, which is based, for example, on an identifier for the node 20 and an identifier for the frame, and a frame priority. The structured data block 84 may be of varying length and may include one or more individual data blocks 88. Each individual data block 88 includes a block error detection code 90 corresponding to that data block 88. The error detection method utilized by both the frame error detection code 86 and the block error detection code 90 may be any suitable error detection algorithm. According to one embodiment, each of the frame and block error detection codes, 86 and 90 respectively, utilize a cyclic redundancy check (CRC) algorithm.

A discovery protocol is executed to determine the topology of the industrial network. The discovery protocol may execute on one or more of the processors 44 in the network either upon power up or upon a user initiated command. If executed on power up, the discovery protocol can automatically identify modifications to the network, such as the addition or removal of nodes 20, while power was removed. Optionally, it is contemplated that a network may remain generally constant and executing the discovery protocol upon a user initiated command will allow the protocol to execute only when a change has been made in the network. The discovery protocol identifies which nodes 20 should be configured as end nodes 22 and which nodes 20 should be configured as intermediate nodes 24. The topology of the nodes 20 is stored in one or more of the memory devices 48.

After executing the discovery protocol, a configuration module is executed on one or more of the processors 44 in the network to determine the data frames 80 required for communications within the network. The configuration module creates two memory images for the network: one for inputs and one for outputs. The size and number of data frames 80 required for the inputs and the outputs are determined according to the network requirements. The configuration module reads the topology of the nodes 20, previously determined by the discovery protocol and stored in a memory device 48, to determine the size and number of data frames 80 required between pairs of end nodes 22. The size and number of data frames 80 is dependent, for example, on the number of intermediate nodes 24 between each end node 22 and on whether each of the intermediate nodes 24 has input data output data, or a combination thereof. The configuration module may further interact with an application program, or a memory map corresponding to the application program, stored in the memory device 48 to identify which end nodes 22 need to communicate with each other.

For example, referring to FIGS. 2 and 3, one of the processor modules 12 may include an application program which only requires data read from input modules 14 and written to output modules 16 mounted in the same rack of the industrial controller rack 11 to which that processor module 12 is mounted. Consequently, the processor module 12 is configured as an end node 22 on a first end of the industrial, controller rack 11 and the last module, for example an output module 16, is configured as an end node 22 on the other end of the industrial controller rack 11. The remaining input modules 14 or output modules 16 within the industrial controller rack 11 are configured as intermediate nodes 24. The configuration module then defines the number and length of data frames 80 required to transfer output data from a first of the end nodes 22 to a second of the end nodes 22 in a first direction 26 and to transfer the input data from the second end node 22 to the first end node 22 in the second direction 28.

Another of the processor modules 12 may include an application program which requires data read from input modules 14 mounted in both the same rack of the industrial controller rack 11 to which the processor module 12 is mounted and a remote I/O rack 13. The application program may similarly require data to be written to output modules 16 mounted in both the same rack of the industrial controller rack 11 to which the processor module 12 is mounted and the remote I/O rack 13. End nodes 22 are defined on both the industrial controller rack 11 and the remote I/O rack 13. The configuration module then defines the number and length of data frames 80 to be transferred between any of the end nodes according to the application requirements. Data frames 80 may be transmitted in both a first and second direction, 26 and 28 respectively, between any two end nodes 22, for example: end nodes 22 within the industrial controller rack 11, end nodes 22 within the remote I/O rack 13, two end nodes 22 connected by the network medium 36, a first end node 22 proximate to the network medium 36 on the industrial controller rack 11 and a second end node 22 distal from the network medium 36 in the remote I/O rack 13, or between multiple combinations of the afore mentioned end nodes 22. The number and length of data frames 80 required to transfer input or output data is dependent on the number and type of intermediate nodes 24 between each pair of end nodes 22.

In addition to identifying end nodes 22 which need to communicate with each other, the configuration module may further interact with the application program, or a memory map corresponding to the application program, stored in the memory device 48 to identify if an intermediate node 24 needs to communicate directly with one of the end nodes 22 or directly to another of the intermediate nodes 24. Each of the nodes 20, whether configured as an end node 22 or an intermediate node 24, is assigned a unique network address. Consequently, special data frames 80 may be configured to permit intermediate nodes 24 to receive or transmit data frames, allowing communication directly between any of the nodes 20 in the network 21.

The configuration module further assigns each data frame 80 a unique identifier. The identifier is contained within the header 82 of the data frame 80 and is a function of the node 20 from which the data frame 80 is sent and of the contents of the data frame 80. As a result of the unique identifier, any of the intermediate nodes 24 through which the data frame 80 passes can determine whether the data frame 80 either includes data for that intermediate node 24 or requires that intermediate node 24 to insert data into the data frame 80. Each of the end nodes 22 reads the unique identifier to determine where the data frame 80 received by that end node 22 should be stored in a memory image on the memory device 48.

The configuration module determines the length and number of data frames 80 required for communications between nodes 20. As previously discussed, the number of data frames 80 is determined, at least in part, as a function of the application program and by the number of end nodes 22 which need to communicate with each other. The length each data frame 80 is further a function of the number of nodes 20 which interface with each data frame 80. Some or all of the intermediate nodes 24 between two end nodes may need to either insert or extract data from each data frame 80, and each end node 22 which serves as the destination of a data frame 80 may similarly need to interact with the structured data block 84 contained in the data frame 80. Depending on the length of the data included in each frame 80, the structured data block 84 may include a single data block 88 or, optionally, may be arranged as multiple data blocks 88. Each data block 88 is of configurable length and may be, for example, 64 bytes in length. Each data block 88 may contain data for, or reserve space for data from, one or more nodes 20. Each data block 88 includes a separate error checking block 90, which may be a 16 bit CRC checksum. The entire data frame 80 further includes a final error checking block 86, which may be a 32 bit CRC checksum. Optionally, if the data frame 80 contains a single data block 88, no separate error checking block 90 is required.

Figure 6:
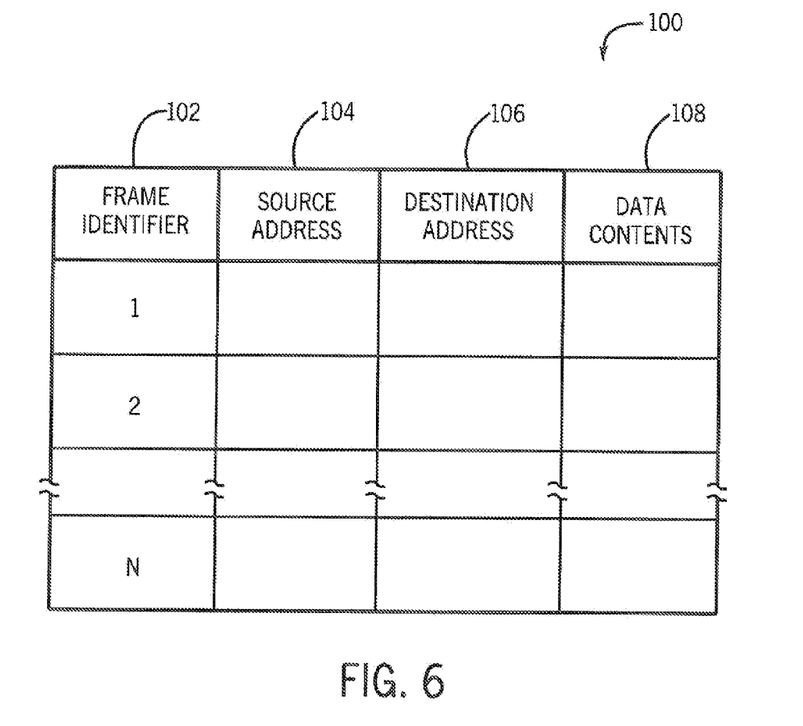
FIG. 6 illustrates an exemplary configuration table according to one embodiment of the present invention.

Once the configuration module has determined each of the data frames 80 required for communications within the network, the completed configuration may be stored in a configuration table 100. As illustrated in FIG. 6, one embodiment of the configuration table 100 includes, for example, a frame identifier 102, a source address 104, a destination address 106, and a description of the data contents 108 contained within the frame 80. The frame identifier 102 in combination with the source address 104 form the unique identifier contained within the header 82 of a data frame 80. The frame identifier 102 may be used to distinguish individual data frames 80 from multiple data frames 80 being sent by the same source. The destination address 106 identifies which node 20 is the intended recipient of the data frame 80 and the nodes 20 retransmit data frames 80 based on the destination address 106. The description of the data contents 108 provides, for example, an offset and a length into the data structure for each of the nodes 20 through which the data frame 80 is passed to identify where data is to be inserted and/or extracted.

It is contemplated that the discovery protocol and configuration module may be separate programs or integrated into a single program. Further, the discovery protocol and configuration module may execute on one or more of the processors 44 in the network, or optionally, execute on a remote processor, for example a computer connected to the network to configure the network. The configuration table 100, or a portion thereof, is stored in a memory device 48 on each node 20 such that the node 20 may identify the data frames 80 with which it needs to interact.

At power up, each of the nodes 20 in the network defaults to operation in the first mode, switch mode. After execution of the discovery protocol and configuration module, those nodes identified as intermediate nodes 24 will begin operation in the second mode, shift mode. Optionally, the topology and configuration of the network may be stored in one or more of the memory devices 48 of the nodes 20, and those nodes 20 previously identified as intermediate nodes 24 may begin operation in the second mode after identifying their status from the stored topology or configuration data. It is further contemplated that it may be desirable for certain intermediate nodes 24, such as bridges or other nodes at which network traffic merges, to continue operation in switch mode.

Communication between nodes 20 is performed in either a first or a second mode of operation. The first mode of operation is well suited to accommodate point-to-point communications. The first mode of operation, also referred to herein as a switch mode, permits the node 20 to initiate transmission of data frames 80 to another node 20. Nodes 20 operating in the switch mode, may similarly receive and process data frames 80 from the network according to the requirements of the network protocol. In addition to being able to initiate transmission of data frames 80 to or receive data frames 80 from the network, nodes 20 operating in switch mode may extract data from or insert data to existing data flames 80 on the fly as described below with respect to the shift mode.

The second mode of operation is well suited to accommodate high speed communications of structured data. In the second mode of operation, also referred to herein as a shift mode, the network interface 30 of a node 20 extracts data from or inserts data to a data frame 80 on the fly as the data frame 80 is retransmitted through a node 20 without requiring the node 20 to process the structured data block 84 through the entire protocol stack associated with the particular industrial network connected to the network interface 30. Instead, a node 20 reads the header 82 of each frame and identifies those data frames 80 that contain information for or require data from that node 20. If the data frame 80 contains information for the node 20, the node 20 reads the data from the structured data block 84 according to the information in the configuration table 100. Further, if the structured data block 84 includes multiple data blocks 88, the node 20 need only wait until the data block 88 and corresponding error checking block 90, which contains the data for that node 20, is processed in order to read the data from the data frame 80 on the fly. Thus, the node 20 need not wait until the end of large data frames 80 to extract data intended for that node 20. Upon receiving the data frame 80, the node 20 retransmits the data frame 80 to the next node 20 in the network with minimal delay.

Similarly, if the data frame 80 includes a reserved location for the node 20 to insert data, the node 20 first reads the data block 88 to determine whether any data presently exists in the block 88, for example, from another node 20. The node 20 uses the existing data and the data which it will insert into the data block 88 to calculate a new 16 bit CRC checksum. The node 20 will insert the data and the new checksum into the data block 88 and the corresponding checksum block 90 respectively on the fly. Upon reception of the entire structured data block 84, the node 20 will recalculate the 32 bit CRC checksum value and insert the new value in the frame CRC block 86 on the fly. The node 20 will thus retransmit the modified data frame 80 to the next node 20 in the network with minimum delay.

Because industrial networks may include a combination of network communications, it may be desirable to establish a transmission schedule 50 to facilitate both modes of operation. Certain data, such as the I/O data used by the control algorithm of an industrial controller must be transmitted reliably at fixed time intervals and with frequent updates in order to properly control an industrial process. Other data containing, for example, configuration information or metrics related to overall process performance may not need frequent updating. Further, the metric may result from a long-term averaging of data input at an intermediate node 24 which needs to transmit the information to the processor module 12 designated as an end node 22. Thus, it is desirable that any node 20 be able to communicate directly with another node 20 while still providing the ability to rapidly shift data between nodes 20.

As illustrated in FIG. 4, an exemplary transmission schedule 50 for a single I/O scan cycle may define three priority windows, 52, 54, and 56. The transmission schedule 50 executes at a periodic interval 58 to manage communications on the ports 34 of the network interface 30. Each priority window, 52, 54, or 56, has a corresponding duration, 62, 64, or 66, the combination, of which sum together to equal the duration 68 of the periodic interval 58. The length of each duration, 62, 64, 66, and 68, is configurable according to the application requirements. In addition, each priority window, 52, 54, or 56, may be configured to transmit messages according to the first mode of operation, the second mode of operation, a combination thereof, or to transmit no messages. Each node 20 includes a transmission schedule 50. According to one embodiment of the invention, all of the nodes 20 may have the same transmission schedule. Optionally, each of the end nodes 22 may have a first transmission schedule and each of the intermediate nodes 24 may have a second transmissions schedule. According to still another embodiment of the invention, an operator may separately configure individual nodes 20 to have unique transmission schedules.

In order to coordinate execution of the transmission schedule 50 among each of the nodes 20, the clock signal 42 from the clock circuits 40 on each of the nodes 20 is synchronized to a master clock signal. Time synchronization may be performed according to any acceptable method, for example the IEEE 1588 standard for clock synchronization. Preferably, the clock circuit 40 from one of the nodes 20 is selected to provide the master clock signal. Optionally, a separate real time clock may provide the master clock signal. The clock signal 42 of each clock circuit 40 is initially synchronized to the master clock signal and is preferably resynchronized on a periodic basis to ensure that the clock signals 42 of each node 20 remain synchronized.

The transmission schedule 50 for a single I/O scan is configured according to the application requirements. According to one embodiment of the invention, the first priority window 52 is configured to transmit the I/O data frames 80 according to a predetermined schedule. During the first priority window 52, each of the end nodes 22 are operating in the switch mode and each of the intermediate nodes 24 are operating in the shift mode. The end nodes 22 initiate transmission of the data frames 80 and the intermediate nodes 24 receive the data frames 80 at a first port 34, act on the frame 80 if it is required according to the configuration table 100, and retransmit the data frame 80 to the next node 20 via a second port 34. The second priority window 54 is configured to transmit any data frame 80. During the second priority window, the end nodes 22 remain in switch mode and each of the intermediate nodes 24 are reconfigured to similarly operate in switch mode. Because each of the nodes 20 includes a unique network address, for example a unique Media Access Control (MAC) address, any of the nodes 20 may now directly communicate to any of the other nodes. The third priority window 56 is defined as a time buffer. During the third priority window 56, no new messages are initiated, and the duration 66 of the third priority window is configured to be long enough to permit any data frames initiated during the second priority window to complete transmission. Thus, no messages should be transmitting at the start 51 of the first priority window 52 in the next I/O scan 58.

Data frames 80 may be received during any point in the transmission schedule 50. Although it is desirable to configure the network such that high priority messages complete transmission within the first priority window 52, an end node 22 may initiate the message during the second priority window 54. Similarly an end node 22 may initiate special frames, for direct communication with an intermediate node 24, or other low priority data frames 80 during the first priority window 52. Each network interface 30 may include multiple buffers and, according to one embodiment of the invention, includes a first set of buffers for the first priority window 52 and a second set of buffers for the second priority window 54. The network interface 30 of each node 20 reads the frame priority from the data frame 80 and determines during which priority window the data frame 80 should be processed. The network interface 30 then passes each data frame 80 to the appropriate buffer, and if the data frame 80 was received outside of the priority window during which it is to be processed, the data frame 80 remains in the buffer. At the next occurrence of the appropriate priority window, the data frame 80 is then processed on a first-in, first-out (FIFO) basis.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

I claim:

1. An industrial network for real-time control, comprising:
a first end node and a second end node, each end node configured to initiate transmission of a data frame to the other end node, wherein each data frame includes an identifier;
at least one intermediate node located between the first end node and the second end node, each intermediate node including:
a memory device for storing a configuration table, wherein the configuration table includes a plurality of identifiers, each identifier corresponding to one of the data frames, and a position within the data frame at which the intermediate node interfaces; and
a network interface configured to:
receive each data frame from the first end node and the second end node;
read the identifier from each data frame;
compare the identifier with the plurality of identifiers stored in the configuration table;
interface with the data frame at the position within the data frame stored in the configuration table when the identifier from the received data frame matches the data frame in the configuration table; and
transmit the received data frame to the other end node.

2. The industrial network of claim 1 wherein the intermediate node is configured to selectively process data frames in a first mode and a second mode, wherein the network interface of the intermediate node passes the data frames received from the first and the second end nodes through a network protocol stack in the first mode and the network interface processes the data frames received from the first and the second end nodes without passing the data frames through the entire network protocol stack in the second mode.

3. The industrial network of claim 2 wherein each of the intermediate nodes is initially configured to operate in the first mode upon power up and is reconfigured to operate in the second mode.

4. The industrial network of claim 2 wherein each of the intermediate nodes includes a network address identifying the intermediate node on the industrial network, wherein the network address is used to process data frames in the first mode.

5. The industrial network of claim 2 wherein each of the intermediate nodes is configurable to operate in either the first or the second mode.

6. The industrial network of claim 2 wherein:
the memory device of the intermediate node stores a transmission schedule defining at least two windows;
the intermediate node processes data frames in the first mode during a first of the two windows;
the intermediate node processes data frames in the second mode during a second of the two windows; and
the network interface of the intermediate node is further configured to execute the transmission schedule at a periodic interval.

7. The industrial network of claim 6 wherein the transmission schedule further includes a third window during which no new data frames are processed.

8. The industrial network of claim 1 wherein at least one of the data frames further comprises:
a plurality of data blocks;
an error checking block corresponding to each of the data blocks; and
an error checking block corresponding to the data frame.

9. The industrial network of claim 8 wherein the network interface either extracts data from or inserts data to one of the data blocks upon receiving the error checking block corresponding to the data block containing the data for the intermediate node on which the network interface is executing.

10. A network interface for a node operable to communicate with at least two other nodes via a network medium in an industrial network, the network interface comprising:
a first port configured to transfer a data frame between the node and a first of the other nodes via the network medium;
a second port configured to transfer the data frame between the node and a second of the other nodes via the network medium, wherein the data frame includes a unique identifier and a structured data block; and
a memory device operable to store a table defining a plurality of data frames, wherein each data frame includes one of a plurality of unique identifiers and one of a plurality of structured data blocks, wherein the network interface is configured to:
read the unique identifier from each data frame received at one of the first port or the second port;
match the unique identifier to one of the plurality of unique identifiers stored in the table;
identify at least one data block within the structured data block of the data frame containing the unique identifier which matches the unique identifier read from the received data frame;
read data from or write data to the at least one identified data block; and
transmit the data frame from one the first port or the second port.

11. The network interface of claim 10 wherein the memory device also stores a network address identifying the node on the industrial network, and a transmission schedule defining at least two windows, wherein:
the network interface executes the transmission schedule at a periodic interval,
the network interface passes the data frames received at the first and second ports through a network protocol stack in a first operating mode during a first of the two windows, and
the network interface processes the data frames received at the first and second ports without passing the data frames through the entire network protocol stack in a second operating mode during a second of the two windows.

12. The network interface of claim 11 wherein the network interface is configurable to switch between operation in either the first or the second operating mode.

13. The network interface of claim 11 wherein during the first operating mode the network interface is operable to initiate transmission of a new data frame and to receive transmission of a data frame intended for the network address of that node.

14. The network interface of claim 11 wherein the processing during the second operating mode includes reading the unique identifier from each data frame received at one of the first port or the second port, matching the unique identifier to one of the plurality of unique identifiers stored in the table, identifying the at least one data block within the structured data block of the data frame containing the unique identifier which matches the unique identifier read from the received data frame, reading data from or writing data to the at least one identified data block, and transmitting the data frame to the other of the first port or the second port.

15. The network interface of claim 11 further comprising a plurality of sets of buffers, each set of buffers configured to receive data frames for processing during each of the periods defined by the transmission schedule, wherein the network interface transfers each of the data frames received at each of the first and second ports to one of the sets of buffers as a function of the window in which it is to be processed and processes each of the data frames on a first-in-first-out basis during each of the windows defined by the transmission schedule.

16. The network interface of claim 11 wherein the transmission schedule further includes a third window during which no new transmissions of data flames are processed.

17. The network interface of claim 10 wherein at least one of the data frames further comprises:
   a plurality of data blocks;
   an error checking block corresponding to each of the data blocks; and
   an error checking block corresponding to the data frame.

18. The network interface of claim 17 wherein, the network interface either extracts data from or inserts data to the data block upon receiving the error checking block corresponding to the data block containing the data for the node on which the network interface is executing.

19. A method of transferring data frames between nodes on an industrial network configured to connect multiple nodes for real-time control of a process, comprising the steps of:
   configuring at least a first node and a second node as end nodes operating in a first mode, wherein the first node initiates transmission of a data frame to the second node and the second node initiates transmission of a data frame to the first node and wherein each data frame includes an identifier and a structured data block;
   configuring at least one node as an intermediate node operating in a second mode, wherein each intermediate node reads data frames from both the first and the second end node;
   reading the identifier contained within each data frame received at the intermediate node;
   selecting data frames in which the identifier read from the data frame corresponds to one of a plurality of identifiers stored in a memory device on the intermediate node;
   extracting data from or inserting data to a predefined position of the selected data frame without passing the data frame through the protocol stack; and
   transmitting the data frame to the other of the first and the second end node.

20. The method of transferring data of claim 19 further comprising the steps of:
   defining a transmission schedule including at least two periods; and
   configuring the intermediate node to alternately execute in a first operating mode to initiate transmission of a data frame, to extract data from a data frame, or to insert data to a data frame during one of the two periods and in a second operating mode to extract data from a data frame or insert data to a data flame during the other of the two periods.

* * * * *